2,798,025

EXTRACTION OF STEROIDAL SAPOGENINS FROM PLANT MATERIAL

Philip Calvert Spensley, London, England, assignor to National Research Development Corporation, London, England, a British body corporate No Drawing. Application February 16, 1953, Serial No. 337,221

Claims priority, application Great Britain March 13, 1952

8 Claims. (Cl. 195—32)

The present invention relates to the production of steroidal sapogenins from plant materials, in particular plant juices which contain them or their precursors or derivatives. It is principally directed to the preparation of hecogenin itself from the juice of the sisal plant (*Agave sisalina*) which contains hecogenin glycosides (saponins), although it may be employed for the recovery of other steroidal sapogenins from their naturally occurring glycosides and other derivatives present in plant juices.

Hecogenin has previously been prepared from certain other species of Agave by extracting the leaves with a lower alcohol, hydrolysing the alcoholic extract and extracting the hecogenin from the product of the hydrolysis by the use of large volumes of ether.

An alternative method has been proposed in co-pending application, Serial No. 278,317, filed March 24, 1952, which describes a method including the removal of alcohol from the hydrolysate to leave an aqueous suspension, which is saponified by means of caustic alkali in alcoholic solution. The product of the saponification is treated to remove the alcohol to leave an aqueous suspension from which hecogenin is recovered, preferably by adsorption on activated charcoal and subsequent extraction therefrom by a solvent such as ether in a Soxhlet apparatus.

A further alternative is described in co-pending application, Serial No. 319,775, filed November 10, 1952, which describes the treatment of the juice of a plant, such as sisal, with mineral acid and the adsorption of the sapogenin liberated on an adsorbent material, which may then optionally be washed with alkali prior to the extraction of the sapogenin therefrom by means of a suitable organic solvent.

The present invention provides a process for the production of a sapogenin characterised by the step of fermenting plant juice containing sapogenin glycosides or other derivatives, collecting the material which separates during fermentation and recovering a sapogenin or sapogenins therefrom. The fermentation is believed to lead to the breakdown of water-soluble sapogenin glycosides to glycosides which are insoluble or of such sparing solubility in water as to be considered as insoluble for practical purposes and to free sapogenin.

The plant juice to which the present invention is mainly directed is derived from plants of the genus Agave and related genera and, in particular, sisal. Water-insoluble solids containing some free hecogenin and some chemically combined hecogenin are formed during the fermentation of juice expressed from sisal. The recovery of free sapogenin from the solid product of fermentation may be effected by direct extraction with a solvent, such as iso-propyl ether, preferably after the water-insoluble product has been dried and finely powdered.

Preferably the sapogenin is recovered from the water-insoluble product of fermentation by heating it with aqueous, aqueous alcoholic or alcoholic mineral acid, collecting the water-insoluble material from the hydrolysate, with or without the use of an adsorbent, such as activated charcoal, alumina or diatomaceous earths, and extracting the sapogenin therefrom with a suitable organic solvent.

The water insoluble material remaining after the acid treatment may be treated, before extraction with a solvent, with aqueous alkali to remove certain impurities, but this operation is not essential to the success of the process as a whole.

Hecogenin can only be recovered from sisal leaves or leaf juice in quantities of about 0.1% of the material treated, and it is therefore important to develop the physical and chemical methods of separating it from the plant material in such a manner that the requirements for apparatus and material to be used in the process are reduced. Apparently quite small advances in separation techniques lead to large savings in the cost of the process with consequent reduction in the cost of the product.

In order to assist the collection of the sludge of water-insoluble solids formed during the fermentation, the suspension may be heated, with or without prior decantation of the supernatant liquid, for a time and to a temperature sufficient to cause agglomeration of the finer solids. This is followed by separation by conventional means, such as by filtration with or without the use of a filter aid, centrifugation or decantation. The beneficial effect of this heating is greatly increased by the prior addition of a small proportion of mineral acid which at the same time may effect slight hydrolysis of the chemically combined sapogenin entrained in the sludge or in solution.

Preferably the sapogenin is recovered from the collected solid matter by heating it with mineral acid and collecting the sapogenin from the water-insoluble matter thus produced, with or without the use of an adsorbent such as activated charcoal, diatomite or other recognized adsorbents, by extraction with a suitable organic solvent.

Good yields of sapogenins combined with economy in the amount of mineral acid employed may thus be obtained if the acid treatment is carried out in two stages, by firstly heating the lower portion of the fermented juice (after discarding the supernatant liquid) with acid, then separating the sludge from the liquid and subsequently subjecting it to a stronger acid hydrolysis by mineral acid in aqueous, aqueous alcoholic or alcoholic solution. Conveniently the sludge after coagulation by heating with the small proportion of mineral acid may be collected by filtration, washed with water and dried. If the latter treatment with stronger acid is carried out in alcoholic or aqueous alcoholic solution, the alcohol may be conveniently removed subsequently by steam distillation.

In the preferred aspect of the invention in which the juice used is that obtained from the sisal plant, the juice may be obtained by pressing or wringing the plant material, in particular the leaves of the plant and, if necessary, straining off from the juice the larger solid particles. It may also be obtained by pressing, wringing or centrifuging the waste material obtained on the wet or, preferably, dry decortication of sisal leaves. The juice is then allowed to ferment and the sludge which precipitates in the course of the fermentation is collected either by decantation of the supernatant liquid or by centrifugation or by filtration with or without the use of a filter aid or by a combination of these methods. The sludge if desired may further be freed from unwanted liquor by washing it in water and collecting it again by one of these procedures.

To aid the collection of the sludge by decantation, centrifugation or filtration, the fermented juice may be heated for a time. If a small proportion of mineral acid is added to the juice prior to this heating, more effective co-agulation is achieved and collection of the sludge is further simplified. The sludge may, if desired, be dried to a solid mass which can conveniently be powdered for further processing for the extraction of the hecogenin.

The plant juice sludge, either as collected from the plant juice or dried, and containing a mixture of saponin and sapogenin, is hydrolysed by means of a mineral acid, for example, hydrochloric acid or sulphuric acid, in aqueous, alcoholic or aqueous alcoholic solution with which it is heated at such a temperature and for such a time, depending upon the nature and amount of acid employed, as may be necessary to complete a satisfactory degree of hydrolysis of the saponin.

The water-insoluble material found in the product of the acid hydrolysis stage (if necessary, after replacement of alcohol by water, as by steam distillation) is then collected from the solution as by decantation, filtration or centrifugation with or without the prior addition of an adsorbent material which may, for example, be activated charcoal, although other adsorbent materials such as activated clays, diatomaceous earths (kieselguhr) or alumina may also be used.

The water-insoluble material found in the product of the acid hydrolysis stage, collected with or without the adsorbent material is with advantage washed in an alkaline solution to remove adsorbed acid impurities, before recovery of the hecogenin, though this operation is not essential to the success of the process as a whole. The washing with alkaline solution may advantageously be preceded and followed by washing with water.

The function of the adsorbent material employed is to assist in the collection of the hecogenin from the aqueous suspension and to retain unwanted coloured impurities when the hecogenin is subsequently extracted therefrom by solvent.

The hecogenin may conveniently be removed from the insoluble material found in the product of the acid hydrolysis stage, collected with or without the adsorbent material and dried, by extraction with an organic solvent, for example, ether, iso-propyl ether, carbon tetrachloride, benzene or ethyl acetate. This yields a solution from which the sapogenin may be obtained as a solid material by evaporation of the solvent until the solution is sufficiently concentrated, followed by cooling when the sapogenin is obtained in a crude crystalline form. The crude crystalline material may be further purified by recrystallisation from the same or a different solvent and/or by chromatography (for example on alumina) or Girard separation or acetylation, washing the crude sapogenin acetate in alcohol and recrystallising it from a solvent such as petrol. Alternatively, the solution of the sapogenin obtained on extraction of the insoluble material formed in the product of the acid hydrolysis stage may be evaporated to dryness and the sapogenin obtained from the residue by crystallisation from an organic solvent, for example, alcohol, and/or by chromatography or Girard separation or conversion to and subsequent purification of the acetate.

An alternative process is that the hecogenin can be obtained by direct extraction of the dried plant juice sludge with an organic fat-solvent, for example, ether, isopropyl ether or carbon tetrachloride. The solution of the sapogenin thus obtained is then treated as described above for the isolation and purification of the sapogenin.

The following examples are given by way of illustration of the method of the invention:

*Example No. 1*

Leaves from sisal plants which are more than half way through their normal life are crushed and the expressed juice strained. This juice is allowed to ferment and settle for a week and the supernatant liquid discarded. To each gallon of the lower portion of the juice in which the sludge is suspended is added concentrated hydrochloric acid (1 litre) and the mixture boiled gently for 4 hours. Activated charcoal (50 grammes) is then added and after incorporating thoroughly is allowed to settle. The clear supernatant acid liquor is discarded and the charcoal washed several times with water by decantation and then dried. It is now extracted thoroughly with carbon tetrachloride in a Soxhlet apparatus after which the carbon tetrachloride solution is evaporated to dryness, the residue being then dissolved as far as possible in hot alcohol and the alcohol solution filtered hot. On concentrating if necessary, and on cooling, crude hecogenin crystallises, is filtered off and purified by recrystallisation from ethyl acetate, by chromatography on alumina, by Girard separation or by heating for a few minutes with twice its weight of acetic anhydride, washing the crude acetate with methyl alcohol and crystallising this in nearly pure form from high boiling petrol.

*Example No. 2*

The waste material obtained from the dry decortication of sisal leaves is pressed out and the resulting juice strained. One gallon of this juice is allowed to ferment for 1 week and then the sludge which develops in the course of the fermentation is collected by means of centrifuge. The sludge is now suspended in twice normal aqueous sulphuric acid solution (1 litre) and the mixture boiled gently for 4 hours. Activated charcoal (50 grammes) is then added and, after one hour, is collected by filtration and washed with water. The charcoal is then treated with normal sodium hydroxide solution (1 litre) at room temperature and again collected, washed with water and dried. It is now extracted thoroughly with ether in a Soxhlet apparatus which may take 48 hours or longer after which the ether solution is concentrated to about 100 cc. and left at room temperature or in a refrigerator for several hours. The crude, crystalline hecogenin (approximately 6 grammes) is filtered off and purified as in Example 1.

*Example No. 3*

The sludge obtained as in Example No. 2 is dried and finely powdered. It is then thoroughly extracted with iso-propyl ether in a Soxhlet apparatus after which the ether solution is concentrated to about 100 cc. and left at room temperature or in a refrigerator for several hours. The crude crystalline hecogenin (approximately 2 grammes) is collected and purified as in Example No. 1.

*Example No. 4*

The waste material obtained from the dry decortication of sisal leaves is pressed out and the resulting juice strained. This juice is allowed to ferment and settle for one week and the supernatant liquid discarded. To each gallon of the lower portion of the juice in which the sludge is suspended is added concentrated sulphuric acid (90 cc.) and the mixture is boiled gently for 4 hours. The precipitate is then collected by filtration, washed with water and dried.

The process up to this stage is preferably carried out by means of apparatus situated on a sisal estate and the dried precipitate may then be processed elsewhere for the following stages of the process.

The product from each gallon of the lower portion of the settled fermented juice is then ground to a powder and heated under reflux for 4 hours with alcohol (500 cc.) containing concentrated sulphuric acid (27 cc.). The alcohol is then distilled off in steam and activated charcoal (40 g.) is added to the resultant aqueous suspension of hecogenin. After one hour the charcoal is collected by filtration, washed with water and dried. It is now extracted with isopropyl ether in a Soxhlet apparatus until completely exhausted, after which the ether extract is concentrated to about 100 cc. and left at room temperature or in a refrigerator for several hours. The crude, crystalline hecogenin is filtered off and purified as in Example No. 1.

At the end of the first stage of the process to aid in the collection of the sludge by any of the recognised methods, including the preferred method of filtration, a filter aid, for example diatomite, may be added to assist in the collection of the sludge. For this purpose calcium sulphate may be produced in situ by the addition of calcium hydroxide or carbonate to the acid treated juice and this also functions as a filter aid. The washed and dried sludge mixed with diatomite, calcium sulphate or other filter aid could then be treated in the same manner as the crude sludge collected from the filter in the above example.

*Example No. 5*

The waste material obtained from the dry decortication of sisal leaves is pressed out and the resulting juice strained. This juice is allowed to ferment and settle for one week and the supernatant liquid discarded. To each 100 gallons of the lower portion of the juice in which the sludge is suspended is added concentrated sulphuric acid (2 gallons) and the mixture boiled gently for 4 hours. The acid coagulated sludge is then allowed to settle, preferably overnight, and the clear, supernatant liquid discarded. The lower layer of suspended sludge is then brought to three times Normal with respect to sulphuric acid by the addition of the appropriate quantity of the concentrated acid and the mixture boiled gently for six hours. The insoluble material is then collected by filtration, this being preceded by decantation of the supernatant acid liquor and redilution with water if it is desired to reduce the acidity of the material to be handled. After washing in the filter apparatus with water and, if desired to remove last traces of acidity, with dilute sodium carbonate solution, the material is dried. If desired this can be done so as to give a biscuit which can be broken up into coarse lumps which may be particularly satisfactory for the subsequent solvent extraction. It is now extracted with iso-propyl ether in a Soxhlet apparatus until completely exhausted, the process thereafter following that described in Example 4.

The advantage of the process provided by the present invention as compared with the process disclosed in our copending application Ser. No. 319,775, is that the partial hydrolysis effected by the fermentation permits an initial concentration of material to be finally treated by acid hydrolysis with the result that the quantity of acid required for the acid hydrolysis and the thermal requirements of the process are all reduced, since it is found that the acid hydrolysis takes place only very slowly if the concentration of the mineral acid during hydrolysis is below about twice Normal.

I claim:

1. A method of preparing hecogenin from sisal and other hecogenin-bearing plants of the genus Agave and related genera, comprising separating plant juice from the plant material, holding the juice to cause fermentation, separating the resultant sludge from the supernatant liquid, and preparing hecogenin from such sludge.

2. A method of preparing hecogenin as claimed in claim 1, further comprising decanting the clear portion of the fermented juice, heating the residual portion of the juice to assist agglomeration of the solid particles of the sludge, and collecting the agglomerated solid particles of the sludge.

3. A method of preparing hecogenin as claimed in claim 2, wherein a low concentration of mineral acid is present in the fermented juice during the heating thereof.

4. A method of preparing hecogenin as claimed in claim 1, further comprising decanting the clear portion of the fermented juice, heating the residual portion of the juice to assist agglomeration of the solid particles of the sludge, collecting the agglomerated solid particles of the sludge, and subjecting the latter to acid hydrolysis to liberate hecogenin from water-insoluble hecogenin glycosides contained therein.

5. A method of preparing hecogenin as claimed in claim 1, further comprising decanting the clear portion of the fermented juice, heating the residual portion of the juice to assist agglomeration of the solid particles of the sludge, collecting the agglomerated solid particles of the sludge, and subjecting the latter to acid hydrolysis by means of alcoholic mineral acid to liberate hecogenin from water-insoluble hecogenin glycosides contained therein.

6. A method of preparing hecogenin as claimed in claim 5, further comprising removing the alcohol of the acid hydrolysis mixture to leave a substantially aqueous suspension of hecogenin and recovering hecogenin from the resultant aqueous suspension.

7. A method of preparing hecogenin as claimed in claim 1, further comprising decanting the clear portion of the fermented juice, heating the residual portion of the juice to assist agglomeration of the solid particles of the sludge, collecting the agglomerated solid particles of the sludge, subjecting the latter to acid hydrolysis to liberate hecogenin from water-insoluble hecogenin glycosides contained therein, and collecting the water-insoluble solids resulting from the acid hydrolysis on an absorbent material such as activated charcoal.

8. A method of preparing hecogenin from sisal and other hecogenin-bearing plants of the genus Agave and related genera, comprising expressing the juice from material derived from said plants, holding the expressed juice to cause fermentation, separating the sludge produced as a result of the fermentation from the supernatant liquid, heating the sludge with mineral acid to agglomerate the finer solid particles therein, collecting the sludge solids, heating the sludge solids with mineral acid to effect substantial hydrolysis of hecogenin glycosides contained therein, removing alcohol by steam distillation if alcoholic acid is employed for the hydrolysis, collecting the material comprising the non-aqueous phase from the resultant aqueous suspension, extracting hecogenin from the collected material by means of an organic solvent and preparing purified hecogenin from the extract.

References Cited in the file of this patent

UNITED STATES PATENTS

| | | |
|---|---|---|
| 2,069,687 | Stoll | Feb. 2, 1937 |
| 2,301,787 | Nord | Nov. 10, 1942 |
| 2,408,834 | Wagner | Oct. 8, 1946 |
| 2,686,752 | Wall | Aug. 17, 1954 |

OTHER REFERENCES

Winterstein: Zeitschrift für Physiol. Chem., vol. 199, pages 25–37 (1931).

Rothman et al.: J. A. C. S., 74 (1952), pages 5791–5792.